United States Patent [19]

Ueno et al.

[11] Patent Number: 5,476,326
[45] Date of Patent: Dec. 19, 1995

[54] SYNTHETIC RESIN BEARING

[75] Inventors: Atsushi Ueno; Tetsuya Aida; Kazuo Kato, all of Fujisawa, Japan

[73] Assignee: Oiles Corporation, Tokyo, Japan

[21] Appl. No.: 346,181

[22] Filed: Nov. 22, 1994

[30] Foreign Application Priority Data

Nov. 30, 1993 [JP] Japan ................. 5-068423 U

[51] Int. Cl.$^6$ .................................. F16C 17/10
[52] U.S. Cl. ............................. 384/125; 384/144
[58] Field of Search ................. 384/125, 91, 144, 384/420, 275, 138

[56] References Cited

U.S. PATENT DOCUMENTS 3,771,846  11/1973  Bass et al. .
4,239,301  12/1980  Pannwitz .
4,325,566   4/1982  Stephan .................... 384/125

FOREIGN PATENT DOCUMENTS 2457410   12/1980  France .
2-140022  11/1990  Japan .
4-34254    8/1992  Japan .
2055155    2/1981  United Kingdom .
2247053    2/1992  United Kingdom .

Primary Examiner—Lenard A. Footland
Attorney, Agent, or Firm—Nixon & Vanderhye

[57] ABSTRACT

A synthetic resin bearing comprised of synthetic resin-made upper and lower bearing cases and a synthetic resin-made bearing member having a disk-shaped thrust bearing piece and a hollow-cylindrical radial bearing piece with a radially extending slit. The bearing member is disposed such that the radial bearing piece is kept in sliding contact with an outer peripheral surface of a hollow cylindrical portion of the lower bearing case, and the thrust bearing piece is kept in sliding contact with a bottom of an annular recess formed in the lower bearing case. The upper bearing case is assembled to the lower bearing case such that an annular engaging hook portion is snappingly fitted over an annular engaging projecting portion of the lower bearing case. Hermetically sealing portions due to labyrinth action are formed between the upper and lower bearing cases, respectively at the snappingly fitting portion, at an engaging portion between an annular suspended portion of the upper bearing case and an annular groove in the lower bearing case, and at an engaging portion between an annular groove in the upper bearing case and an annular projection of the lower bearing case.

2 Claims, 5 Drawing Sheets

SYNTHETIC RESIN BEARING

BACKGROUND OF THE INVENTION

1. Field of the Invention

The present invention relates to a synthetic resin bearing which is disposed between two members which rotate relative to each other and is capable of smoothly supporting the radial load and the thrust load, the synthetic resin bearing being particularly suitable for use in a strut-type suspension (MacPherson type) in a four-wheel drive vehicle.

2. Description of the Related Art

In general, a strut-type suspension is mainly used on a front wheel of a four-wheel drive vehicle, and is arranged such that a strut assembly, which incorporates a hydraulic shock absorber in an outer cylinder formed integrally with a main shaft, is combined with a coil spring. As the structures of this type of suspension, there are the following two structures: (1) a structure in which the axis of the coil spring is positively offset with respect to the axis of the strut, and the sliding of the piston rod of the shock absorber incorporated in the strut is effected smoothly, and (2) a structure in which the axis of the coil spring is aligned with the axis of the strut.

In either structure, a bearing is disposed between a chassis-side mounting member and an upper spring seat of the coil spring to allow smooth rotation of the strut assembly when the strut assembly rotates together with the coil spring in a steering operation.

As the bearing, a rolling bearing using balls or a sliding bearing formed of a synthetic resin is used.

However, the rolling bearing has a problem in that fatigue failure can possibly occur in the balls due to very small vibrations, vibrational load, and the like, thereby making it difficult to maintain smooth steering operation over extended periods of time.

On the other hand, the sliding bearing formed of a synthetic resin has a problem in that since the coefficient of friction of the sliding bearing is high, the steering operation is made heavy.

Furthermore, in either type of the bearing, a dust seal formed of an elastomeric resilient member is fitted between surfaces of relative rotation for the purpose of preventing the entry of foreign objects, such as dust, onto the sliding surfaces. Since the dust seal is disposed between and in close sliding contact with the surfaces of relative rotation, there is a problem in that the sliding frictional force is high during the steering operation, so that the steering force is made heavy, and that particularly in the case of the sliding bearing formed of a synthetic resin, the steering force is made even heavier.

To overcome these problems of the conventional art, Japanese Utility Model Application Laid-Open No. 2-140022 (hereafter referred to as the prior art) discloses a synthetic resin bearing which is capable of maintaining a stable steering force over extended periods of time by smoothly supporting the radial load and the thrust load by preventing the entry of foreign objects, such as dust, onto the sliding surfaces without using a dust seal formed of an elastomeric resilient member.

The synthetic resin bearing according to this prior art is comprised of a synthetic resin-made upper case, a synthetic resin-made lower case, and a synthetic resin-made bearing piece having a hollow cylindrical radial bearing piece and a disk-shaped thrust bearing piece which are disposed in the upper and lower cases. The upper and lower cases are assembled by being snappingly fitted to each other. At the same time, hermetically sealing portions which exhibit labyrinth action are formed on both inner and outer peripheral sides thereof. The radial load is received between the hollow cylindrical radial bearing piece and the lower case or the upper case, while the thrust load is received between the disk-shaped thrust bearing piece and the lower case or the upper case.

This synthetic resin bearing is capable of preventing the entry of foreign objects, such as dust, onto the sliding surfaces without using a dust seal formed of the elastomeric resilient member described above, and is capable of smoothly supporting the thrust load and the radial load by a combination of synthetic resins excelling in the sliding characteristic.

However, since all the upper and lower cases and the bearing pieces which are disposed in the upper and lower cases are formed of synthetic resins, these component parts are bound to have dimensional variations due to molding shrinkage. Particularly in a case where the diameter of the hollow cylindrical radial bearing piece for bearing the radial load is large, it is necessary to provide large dimensional tolerances. Hence, it is difficult to maintain proper gaps for the snappingly fitting portions and engaging portions of the upper and lower cases in the estimation of the dimensional tolerances of the component parts. Consequently, there arise problems in that the snappingly fitting portions and engaging portions slide on each other with excessive friction, and large gaps are formed in the snappingly fitting portions, with the result that the smooth relative rotation of the upper and lower cases is hampered, and the entry of foreign objects, such as dust, into the bearing is disadvantageously facilitated. These problems become more noticeable by the temperature change at the position where the synthetic resin bearing is installed.

SUMMARY OF THE INVENTION

The present invention has been devised in view of the above-described circumstances, and it is an object of the present invention to provide a synthetic resin bearing having an arrangement which is capable of coping with variations in the dimensional accuracy of the upper and lower cases and the bearing pieces as well as dimensional changes due to the temperature change at the position where the bearing is installed, thereby overcoming the above-described drawbacks of the conventional art.

To attain the above object, in accordance with the present invention, there is provided a synthetic resin bearing comprising: a synthetic resin-made lower bearing case including a hollow cylindrical portion having an inner peripheral surface defining an insertion hole, an annular wide collar portion extending integrally outward from a lower end of the hollow cylindrical portion, an annular projecting portion formed on an upper surface of the collar portion concentrically with the hollow cylindrical portion and defining an annular recess in association with an outer peripheral surface of the hollow cylindrical portion and the upper surface of the collar portion, an annular engaging projecting portion provided projectingly on an outer peripheral edge of the collar portion and defining an annular groove in association with an outer peripheral surface of the annular projecting portion; and an annular projection provided projectingly on an outer side of an end face of the hollow cylindrical portion in such a manner as to form an annular shoulder portion on an inner side of the end face; a synthetic resin-made upper bearing case including a hollow cylindrical block portion, an annular collar portion extending inward from an upper end of an inner peripheral surface of the hollow cylindrical block portion; an annular groove which is formed in a lower surface of the collar portion, an annular suspended portion provided projectingly on a lower surface of the hollow cylindrical block portion concentrically with the inner peripheral surface thereof, and an annular engaging hook portion which extends from the lower surface of the hollow cylindrical block portion and which defines an annular deep groove in association with an outer peripheral surface of the annular suspended portion; and a synthetic resin-made bearing member including a disk-shaped thrust bearing piece and a hollow cylindrical radial bearing piece having a slit extending in an axial direction; wherein the bearing member is disposed in the lower bearing case such that the radial bearing piece is kept in sliding contact with the outer peripheral surface of the hollow cylindrical portion of the lower bearing case, and the thrust bearing piece is kept in sliding contact with a bottom of the annular recess formed in the upper surface of the annular wide collar portion of the lower bearing case; wherein the upper bearing case is assembled to the lower bearing case such that the inner peripheral surface of the hollow cylindrical block portion of the upper bearing case is brought into sliding contact with an outer peripheral surface of the radial bearing piece, and the lower surface of the hollow cylindrical block portion is brought into sliding contact with the thrust bearing piece, that the annular groove in the lower surface of the annular collar portion is engaged with the annular projection on the end face of the hollow cylindrical portion of the lower bearing case, that the annular suspended portion on the lower surface of the hollow cylindrical block portion is engaged in the annular groove by radially overlapping with the annular projecting portion on the upper surface of the annular wide collar portion of the lower bearing case, and that the annular engaging hook portion is snappingly fitted to the annular engaging projecting portion of the lower bearing case; and wherein hermetically sealing portions due to labyrinth action are formed between the upper and lower bearing cases, respectively at a snappingly fitting portion between the annular engaging hook portion of the upper bearing case and the annular engaging projecting portion of the lower bearing case, at an engaging portion between the annular suspended portion of the upper bearing case and the annular groove in the lower bearing case, and at an engaging portion between the annular groove in the upper bearing case and the annular projection of the lower bearing case.

In the above-described arrangement, it is possible to adopt an arrangement in which another annular projecting portion is provided projectingly on an inner side of the end face of the hollow cylindrical portion of the synthetic resin-made lower bearing case, an annular groove is formed by the inner-side annular projecting portion and the outer-side annular projecting portion of the end face of the hollow cylindrical portion of the lower bearing case, and an inner annular projection which forms the annular groove in the lower surface of the annular collar portion of the upper bearing case is engaged in the groove such that an end portion of the inner annular projection radially overlaps with the annular projecting portions so as to form a hermetically sealing portion due to labyrinth action in the overlapping portion.

The synthetic resin for forming the upper and lower bearing cases should preferably excel in mechanical characteristics such as wear resistance, shock resistance, and creep resistance. In addition, the synthetic resin for forming bearing members constituted by the hollow cylindrical radial bearing and the disk-shaped thrust bearing which are disposed in the upper and lower bearing cases should preferably be provided with a self-lubricating characteristic, in particular, and resins which may be suitably used for these members include, for instance, polyacetal resins, polyamide resins, thermoplastic polyester resins such as polybutylene terephthalate resin (PBT), and polyolefin resins such as polyethylene and polypropylene.

The same synthetic resin as that of the bearing member is used for the upper and lower bearing cases. Particularly, it is desirable that the synthetic resin have a favorable frictional characteristic in relation to the synthetic resin used for the bearing member and have relatively high hardness, and polyacetal resins and polyamid resins may be suitably used.

The hollow radial bearing piece constituting a synthetic resin bearing member has a slit extending along the axial direction, and the radial bearing piece is provided with dimensional freedom in its radial direction by the slit.

In accordance with the present invention, the synthetic resin bearing members which are built in the synthetic resin-made upper and lower cases include a disk-shaped radial bearing piece having a slit extending along the axial direction and a disk-shaped thrust bearing piece. Since the radial bearing piece is provided with dimensional freedom in its radial direction by the slit, the dimensional tolerances which take molding shrinkage or temperature change into consideration can be controlled by the amount of molding shrinkage of their thicknesses and the amounts of expansion and shrinkage due to temperature change. Consequently, appropriate gaps can be provided for the snappingly fitting portions and engaging portions of the upper and lower bearing cases.

Accordingly, since excessively close contact does not occur in the snappingly fitting portions and engaging portions of the upper and lower bearing cases, or large gaps do not occur between such portions, it is possible to maintain proper gaps between the snappingly fitting portions and engaging portions of the upper and lower bearing cases, thereby making it possible to allow the upper and lower bearing cases to undergo smooth relative rotation.

The above and other objects, features and advantages of the present invention will become more apparent from the following detailed description of the invention when read in conjunction with the accompanying drawings which illustrate the embodiments of the present invention. It is to be understood, however, that the present invention is not limited to these embodiments.

DESCRIPTION OF THE PREFERRED EMBODIMENTS

Figure 1:
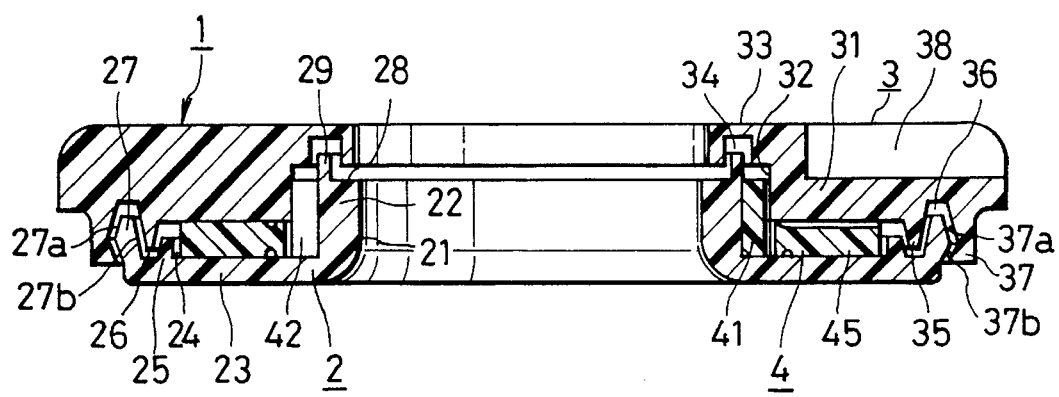
FIG. 1 is a vertical cross-sectional view illustrating a preferred embodiment of a synthetic resin bearing in accordance with the present invention.
Figure 2:
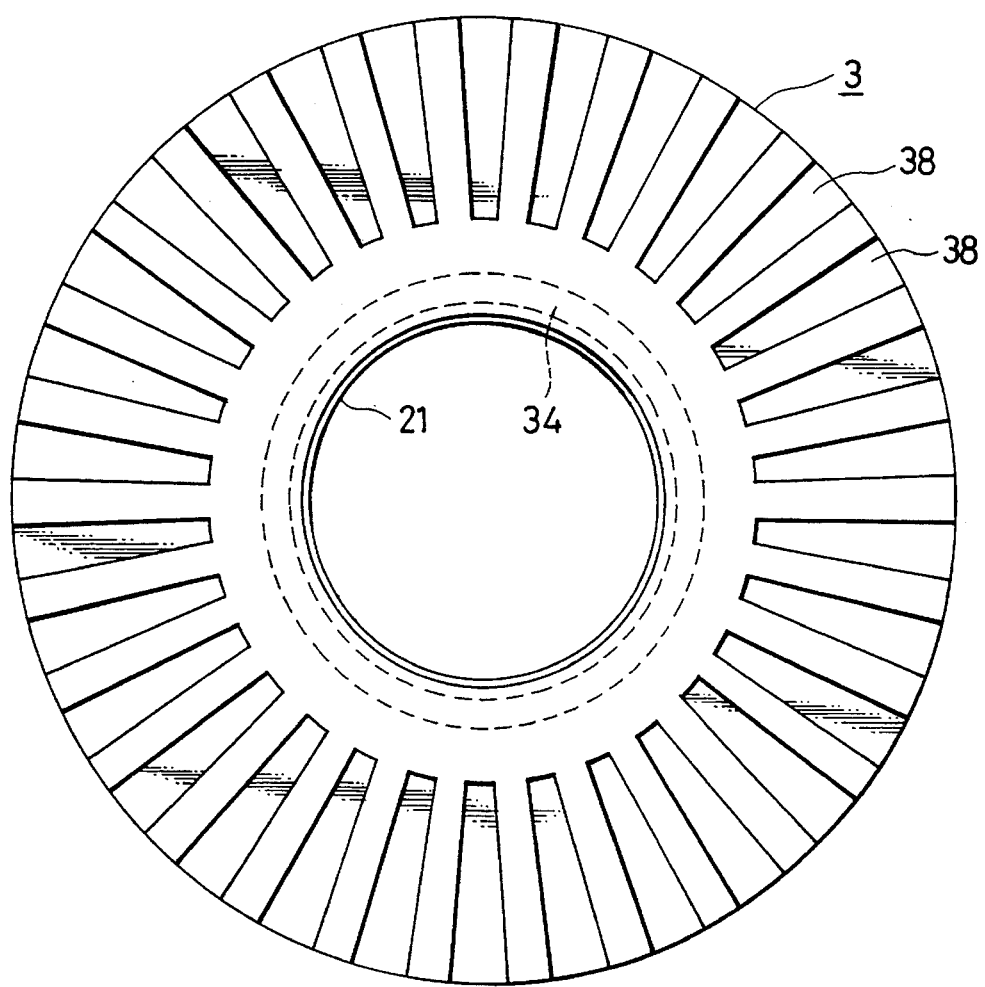
FIG. 2 is a plan view of the embodiment shown in FIG. 1.

In FIGS. 1 to 6, a synthetic resin bearing 1 is comprised of a synthetic resin-made lower bearing case 2, a synthetic resin-made upper bearing case 3, and a synthetic resin-made bearing member 4 disposed in the upper and lower bearing cases.

The synthetic resin-made lower bearing case 2 includes the following: a hollow cylindrical portion 22 having an inner peripheral surface defining an insertion hole 21; an annular wide collar portion 23 extending integrally outward from a lower end of the hollow cylindrical portion 22; an annular projecting portion 25 formed on an upper surface of the wide collar portion 23 concentrically with the hollow cylindrical portion 22 and defining an annular recess 24 in association with an outer peripheral surface of the hollow cylindrical portion 22 and the upper surface of the wide collar portion 23; an annular engaging projecting portion 27 provided projectingly on an outer peripheral edge of the wide collar portion 23 and defining an annular groove 26 in association with an outer peripheral surface of the annular projecting portion 25; and an annular projection 29 provided projectingly on the outer side of an end face of the hollow cylindrical portion 21 in such a manner as to form an annular shoulder portion 28 on the inner side of the end face.

The annular engaging projecting portion 27 has a tapered surface portion 27a which is inclined outward from an upper end of its outer peripheral surface, as well as a tapered surface portion 27b which continues from the tapered surface portion 27a and is inclined so as to continue to an outer peripheral surface of the wide collar portion 23.

The synthetic resin-made upper bearing case 3 includes the following: a hollow cylindrical block portion 31; an annular collar portion 33 extending inward from an upper end of an inner peripheral surface 32 of the hollow cylindrical block portion 31; an annular groove 34 which is formed in a lower surface of the collar portion 33 and is downwardly open; an annular suspended portion 35 provided projectingly on a lower surface of the hollow cylindrical block portion 31 concentrically with the inner peripheral surface thereof; and an annular engaging hook portion 37 which is provided projectingly on the lower surface of the hollow cylindrical block portion 31 and which defines an annular deep groove 36 in association with an outer peripheral surface of the suspended portion 35.

The annular engaging hook portion 37 has on its inner peripheral surface a tapered surface portion 37a which is inclined outward from the hollow cylindrical block portion 31, as well as a tapered surface portion 37b which continues from the tapered surface portion 37a and is inclined so as to continue to a lower end of the hook portion 37.

A multiplicity of grooves 38 are formed radially in an upper surface of the hollow cylindrical block portion 31 of the synthetic resin-made upper bearing case 3, and the thickness of the synthetic resin-made upper bearing case 3 is formed as uniformly as possible by means of the grooves 38.

The synthetic resin-made bearing member 4 includes a hollow cylindrical radial bearing piece 41 and a disk-shaped thrust bearing piece 45.

Figure 3:
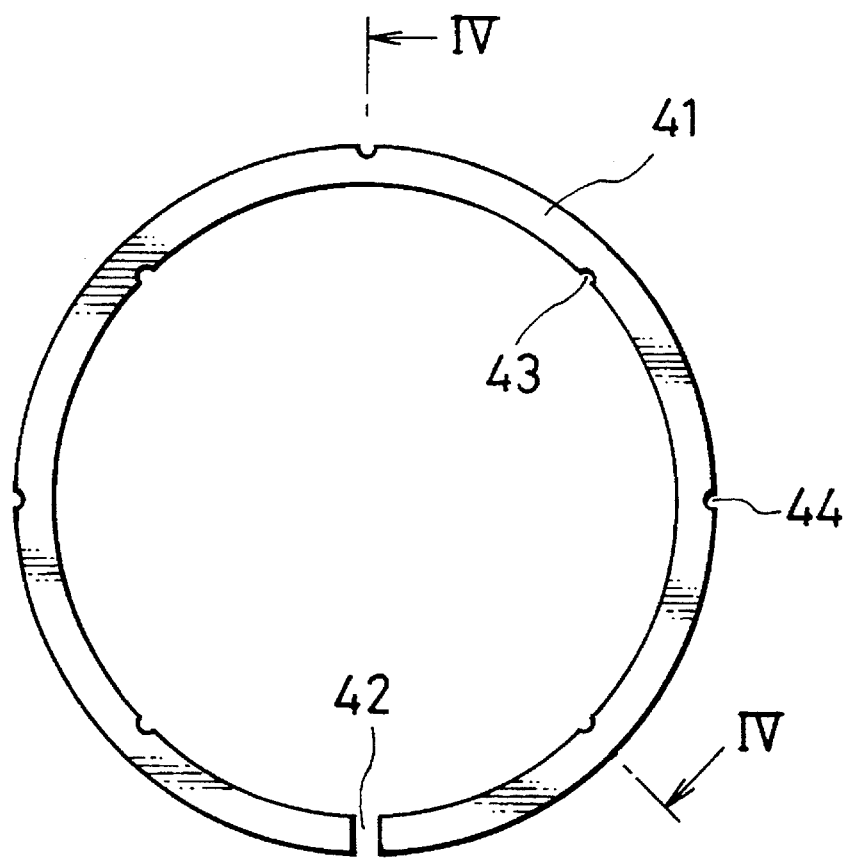
FIG. 3 is a plan view illustrating a cylindrical radial bearing piece constituting a part of a synthetic resin bearing member.
Figure 4:
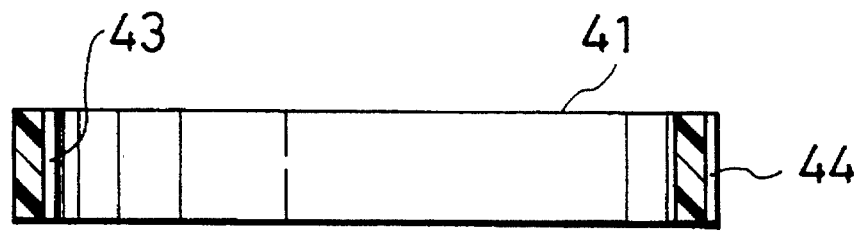
FIG. 4 is a cross-sectional view taken along line IV—IV in FIG. 3.

As shown in FIGS. 3 and 4, the hollow cylindrical radial bearing piece 41 has a slit 42 extending along the axial direction, and a plurality of grooves 43 and 44 are formed at equal intervals in the circumferential direction in inner and outer peripheral surfaces thereof, respectively, in such a manner as to extend along the axial direction. In this embodiment, an example is shown in which three grooves 44 are formed in the outer peripheral surface, while four grooves 43 are formed in the inner peripheral surface at positions offset by 45° in the circumferential direction from the respective grooves 44 formed in the outer peripheral surface. These grooves 43 and 44 serve as portions for retaining a lubricant such as grease.

Figure 5:
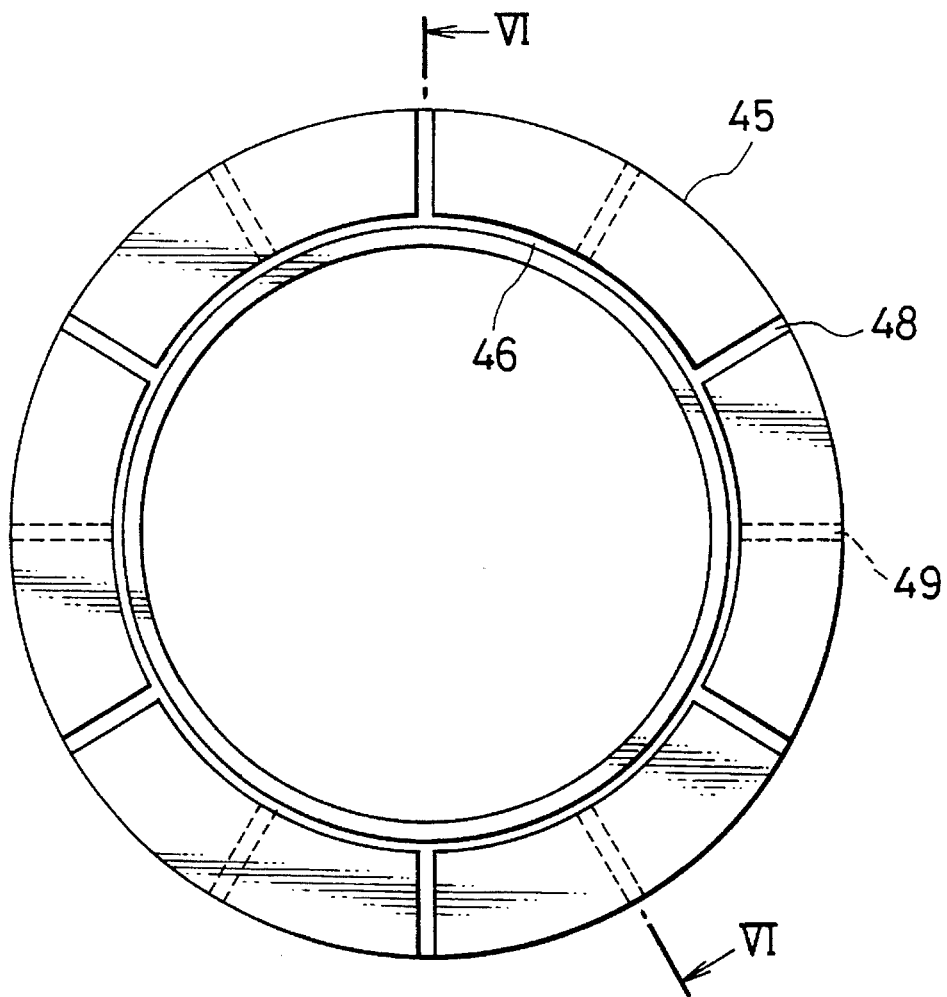
FIG. 5 is a plan view illustrating a disk-shaped thrust bearing piece constituting another part of the synthetic resin bearing member.
Figure 6:
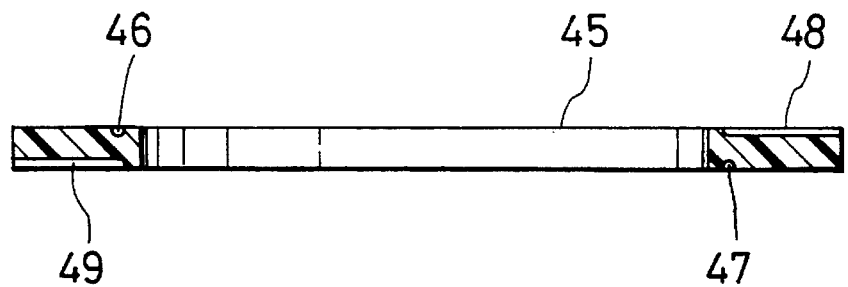
FIG. 6 is a cross-sectional view taken along line VI—VI of FIG. 5.

As shown in FIGS. 5 and 6, in the disk-shaped thrust bearing piece 45, an annular groove 46 and an annular groove 47 are formed in upper and lower thrust surfaces along inner peripheral edges thereof, respectively, while a plurality of radial grooves 48 and 49, whose one ends communicate with the respective annular grooves and whose other ends are open to the outer peripheral surface side, are formed at equal intervals in the circumferential direction. In this embodiment, an example is shown in which six radial grooves are formed in each of the upper and lower thrust surfaces, and the radial grooves are offset from each other by 30° in the circumferential direction. These annular grooves 46 and 47 and the radial grooves 48 and 49 are used as portions for retaining a lubricant such as grease.

The hollow cylindrical radial bearing piece 41 having the slit 42 is built in the lower bearing case 2 such that its inner peripheral surface is kept in sliding contact with the outer peripheral surface of the hollow cylindrical portion 22 of the lower bearing case 2. The disk-shaped thrust bearing piece 45 is built in the lower bearing case 2 such that its inner peripheral surface maintains an annular gap between the same and the outer peripheral surface of the hollow cylindrical radial bearing piece 41, and such that one of its thrust surfaces is kept in sliding contact with a bottom of the annular recess 24 formed in the upper surface of the annular wide collar portion 23 of the lower bearing case 2.

The lower bearing case 2 with the synthetic resin-made bearing member 4 built therein is so relatively rotatably assembled to the upper bearing case 3 that the inner peripheral surface 32 of the hollow cylindrical block portion 31 of the upper bearing case 3 is brought into sliding contact with the outer peripheral surface of the hollow cylindrical radial bearing piece 41, and the lower surface of the hollow cylindrical block portion 31 is brought into sliding contact with the other thrust surface of the disk-shaped thrust bearing piece 45, that the annular groove 34 in the lower surface of the annular collar portion 33 is engaged with the annular projection 29 on the end face of the hollow cylindrical portion 22 of the lower bearing case 2, that the annular suspended portion 35 on the lower surface of the hollow cylindrical block portion 31 is engaged in the annular groove 26 by radially overlapping with the annular projecting portion 25 on the upper surface of the annular wide collar portion 23 of the lower bearing case 2, and that, at the same time, the annular engaging hook portion 37 is snappingly fitted to the annular engaging projecting portion 27 of the lower bearing case 2.

Then, as the upper and lower bearing cases 2 and 3 are thus assembled, hermetically sealing portions due to labyrinth action are formed between the upper and lower bearing cases 3 and 2, respectively at a snappingly fitting portion between the annular engaging hook portion 37 of the upper bearing case 3 and the annular engaging projecting portion 25 of the lower bearing case 2, at an engaging portion between the annular suspended portion 35 of the upper bearing case 3 and the annular groove 26 in the lower bearing case 2, and at an engaging portion between the annular groove 34 in the upper bearing case 3 and the annular projection 29 of the lower bearing case 2. The sliding surfaces which are formed between the synthetic resin-made bearing member 4 including the hollow cylindrical radial bearing piece 41 and the disk-shaped thrust bearing piece 45 on the one hand, and each of the upper and lower bearing cases 3 and 2 on the other, are protected from the entry of foreign objects, such as dust, from the outside by means of these hermetically sealing portions.

Figure 7:
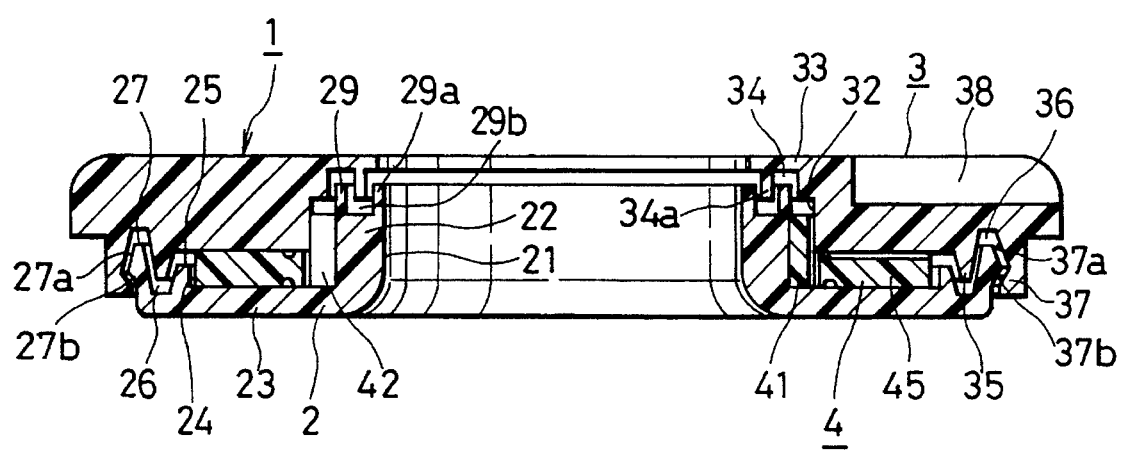
FIG. 7 is a vertical cross-sectional view illustrating another embodiment of the synthetic resin bearing in accordance with the present invention.

FIG. 7 is a cross-sectional view illustrating another embodiment of the synthetic resin bearing in accordance with the present invention.

In the synthetic resin bearing in this embodiment, a modification is made in the arrangement of the end face of the hollow cylindrical portion 22 of the lower bearing case 2 which is engaged in the annular groove 34 provided in the upper bearing case 3 of the synthetic resin bearing 1 in accordance with the above,described embodiment, so as to further strengthen the effect of preventing the entry of foreign objects such as dust onto that portion. Those portions that are identical to those of the above-described embodiment are denoted by the same reference numerals.

Namely, in the synthetic resin-made lower bearing case 2, an annular groove 29b is formed by annular projecting portions 29 and 29a which are provided projectingly on the end face of the hollow cylindrical portion 22 on inner and outer peripheral sides thereof, respectively.

An inner annular projection 34a which forms the annular groove 34 in the lower surface of the annular collar portion 33 of the upper bearing case 3 is positioned in the annular groove 29b such that its end portion radially overlaps with the annular projecting portions 29 and 29a.

Such an arrangement forms a hermetically sealing portion, which exhibits labyrinth action, on the inner peripheral side of the bearing, .thereby further enhancing the effect of the entry of foreign objects such as dust.

Figure 8:
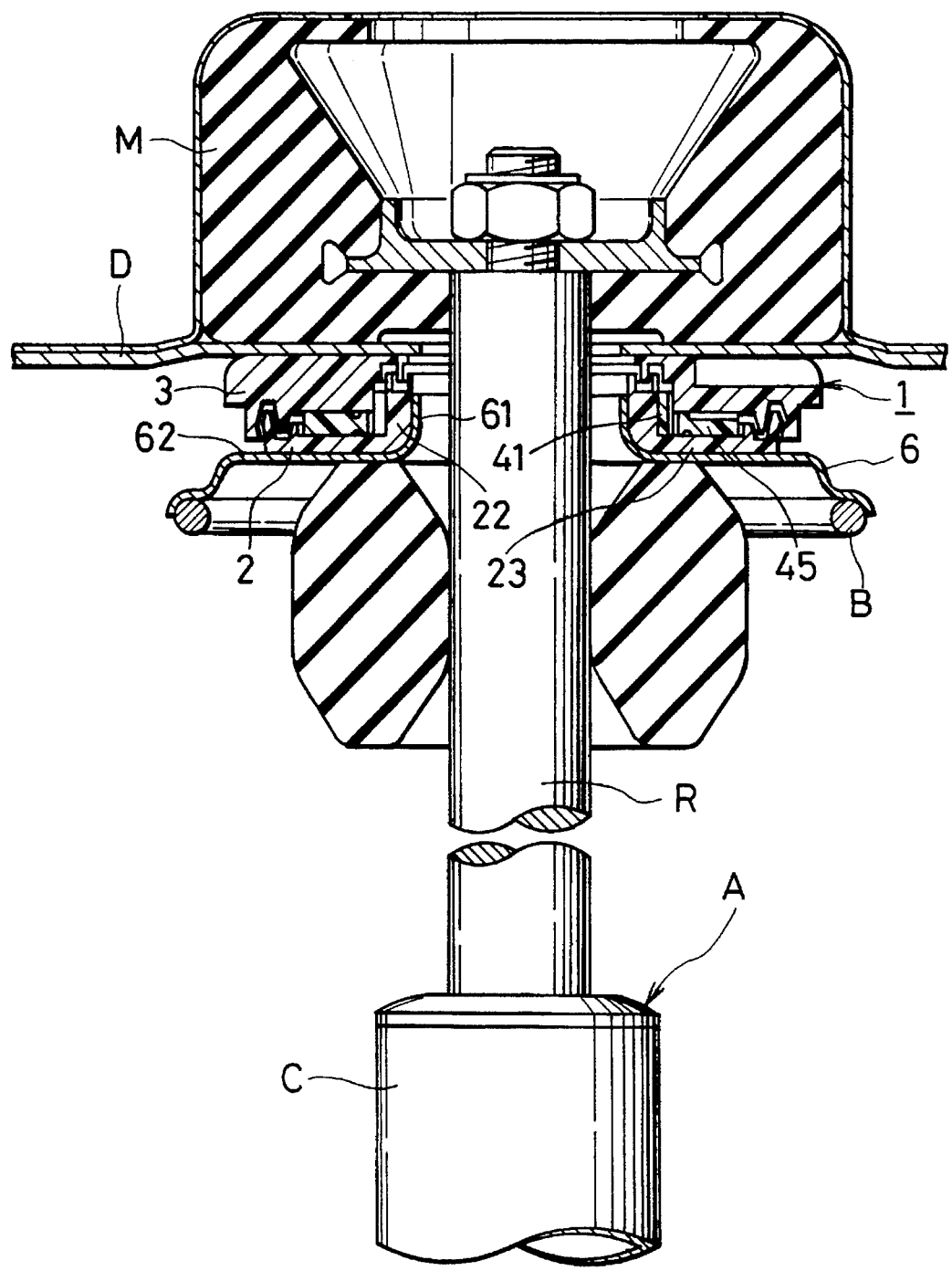
FIG. 8 is a vertical cross-sectional view illustrating an example in which the synthetic resin bearing shown in FIG. 7 is applied to a strut-type suspension.

FIG. 8 is a cross-sectional view illustrating an example in which the synthetic resin bearing 1 shown in FIG. 7 is installed in a strut-type suspension.

The strut-type suspension is arranged such that a strut assembly A, which incorporates a hydraulic shock absorber (oil damper) in an outer cylinder C formed integrally with an axle, is combined with a coil spring B. In FIG. 8, numeral 6 denotes an upper spring seat of the coil spring B. A piston rod R of the strut assembly A is coupled to a chassis-side mounting member D via a mount insulator M.

This strut-type suspension of a type in which a large load inputted from the coil spring B is transmitted to the chassis side via the bearing 1, and finely vibrating load inputted from the piston rod R of the shock absorber is transmitted to chassis side via the mount insulator M.

The synthetic resin bearing 1 is disposed such that the inner surface of the hollow cylindrical portion 22 of the synthetic resin-made lower bearing case 2 is fitted over the outer surface of an annular projecting portion 61 of the upper spring seat 6, and the lower surface of the annular Wide collar portion 23 is seated on a flat portion 62 of the upper spring seat 6, while the upper surface of the upper bearing case 3 abuts against the chassis-side mounting member D.

The upper and lower baring cases 3 and 2 of the synthetic resin bearing 1 are disposed between the upper spring seat 6 and the chassis-side mounting member D in such a manner as to be capable of rotating relative to each other via the hollow cylindrical radial bearing piece 41 and the disk-shaped thrust bearing piece 45.

What is claimed is:

1. A synthetic resin bearing comprising:

a synthetic resin-made lower bearing case including a hollow cylindrical portion having an inner peripheral surface defining an insertion hole, an annular wide collar portion extending integrally outward from a lower end of the hollow cylindrical portion, an annular projecting portion formed on an upper surface of the collar portion concentrically with the hollow cylindrical portion and defining an annular recess in association with an outer peripheral surface of the hollow cylindrical portion and the upper surface of the collar portion, an annular engaging projecting portion provided projectingly on an outer peripheral edge of the collar portion and defining an annular groove in association with an outer peripheral surface of the annular projecting portion; and an annular projection provided projectingly on an outer side of an end face of the hollow cylindrical portion in such a manner as to form an annular shoulder portion on an inner side of the end face;

a synthetic resin-made upper bearing case including a hollow cylindrical block portion, an annular collar portion extending inward from an upper end of an inner peripheral surface of the hollow cylindrical block portion; an annular groove which is formed in a lower surface of the collar portion, an annular suspended portion provided projectingly on a lower surface of the hollow cylindrical block portion concentrically with the inner peripheral surface thereof, and an annular engaging hook portion which extends from the lower surface of the hollow cylindrical block portion and which defines an annular deep groove in association with an outer peripheral surface of the annular suspended portion; and a synthetic resin-made bearing member including a disk-shaped thrust bearing piece and a hollow cylindrical radial bearing piece having a slit extending in an axial direction;

wherein the bearing member is disposed in the lower bearing case such that the radial bearing piece is kept in sliding contact with the outer peripheral surface of the hollow cylindrical portion of the lower bearing case, and the thrust bearing piece is kept in sliding contact with a bottom of the annular recess formed in the upper surface of the annular wide collar portion of the lower bearing case;

wherein the upper bearing case is assembled to the lower bearing case such that the inner peripheral surface of the hollow cylindrical block portion of the upper bearing case is brought into sliding contact with an outer peripheral surface of the radial bearing piece, and the lower surface of the hollow cylindrical block portion is brought into sliding contact with the thrust bearing piece, that the annular groove in the lower surface of the annular collar portion is engaged with the annular projection on the end face of the hollow cylindrical portion of the lower bearing case, that the annular suspended portion on the lower surface of the hollow cylindrical block portion is engaged in the annular groove by radially overlapping with the annular projecting portion on the upper surface of the annular wide collar portion of the lower bearing case, and that the annular engaging hook portion is snappingly fitted to the annular engaging projecting portion of the lower bearing case; and wherein hermetically sealing portions due to labyrinth action are formed between the upper and lower bearing cases, respectively at a snappingly fitting portion between the annular engaging hook portion of the upper bearing case and the annular engaging projecting portion of the lower bearing case, at an engaging portion between the annular suspended portion of the upper bearing case and the annular groove in the lower bearing case, and at an engaging portion between the annular groove in the upper bearing case and the annular projection of the lower bearing case.

2. A synthetic resin bearing according to claim 1, wherein another annular projecting portion is provided projectingly on an inner side of the end face of the hollow cylindrical portion of the synthetic resin-made lower bearing case, an annular groove is formed by the inner-side annular projecting portion and the outer-side projecting portion, and an inner annular projection which forms the annular groove in the lower surface of the annular collar portion of the upper bearing case is engaged in said groove such that an end portion of the inner annular projection radially overlaps with the annular projecting portions so as to form a hermetically sealing portion due to labyrinth action in the overlapping portion.

* * * * *